United States Patent
Wada

(10) Patent No.: US 7,380,256 B2
(45) Date of Patent: May 27, 2008

(54) DISK DEVICE

(75) Inventor: Shinichi Wada, Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 201 days.

(21) Appl. No.: 10/570,120

(22) PCT Filed: Sep. 3, 2004

(86) PCT No.: PCT/JP2004/013175

§ 371 (c)(1),
(2), (4) Date: Mar. 2, 2006

(87) PCT Pub. No.: WO2005/024817

PCT Pub. Date: Mar. 17, 2005

(65) Prior Publication Data

US 2006/0277562 A1    Dec. 7, 2006

(30) Foreign Application Priority Data

Sep. 8, 2003    (JP)    ............................. 2003-315254

(51) Int. Cl.
*G11B 17/028* (2006.01)
*G11B 17/04* (2006.01)

(52) U.S. Cl. ...................... 720/707; 720/706; 720/709; 720/713

(58) Field of Classification Search ................ 720/707, 720/706, 709, 713
See application file for complete search history.

(56) References Cited

U.S. PATENT DOCUMENTS

| | | | | |
|---|---|---|---|---|
| 6,151,285 | A * | 11/2000 | Watanabe et al. | 720/610 |
| 6,799,324 | B1 * | 9/2004 | Takagi et al. | 720/712 |
| 2002/0044522 | A1 * | 4/2002 | Inata et al. | 369/271 |
| 2002/0067687 | A1 * | 6/2002 | Kato | 369/271 |
| 2002/0150027 | A1 * | 10/2002 | Kato | 369/270 |

FOREIGN PATENT DOCUMENTS

| | | |
|---|---|---|
| JP | 2002-74797 | 3/2002 |
| JP | 2003-178503 | 6/2003 |

* cited by examiner

*Primary Examiner*—William J Klimowicz
(74) *Attorney, Agent, or Firm*—Dickinson Wright, PLLC

(57) ABSTRACT

A disk drive comprising a turntable 10 which has a ring-like disk receiving surface 11 on which a disk 40 is placed, a disk holding mechanism 20 which holds the disk 40 on the turntable 10, a disk-retaining abutment member 30 which has projections 34 and 35 provided at an outer periphery of the hole 31 and projecting toward the turntable 10, and a moving mechanism which allows the disk-retaining abutment member 30 and the turntable 10 to relatively approach each other and separate from each other, wherein the projections 34 and 35 are formed by a first deformed portion formed at a position opposed to the disk receiving surface 11 and a second deformed portion formed at a location closer to an inner peripheral side than the disk receiving surface 11, the projection 34 or 35 formed by the second deformed portion most projects toward the turntable 10.

14 Claims, 5 Drawing Sheets

DISK DEVICE

TECHNICAL FIELD

The present invention relates to a disk drive which records and reproduces a disk storage medium such as a CD and a DVD, and more particularly, to a slim or thin disk drive used as domestic video equipment or a peripheral device of a computer.

BACKGROUND TECHNIQUE

With reduction of a computer in size and thickness, the needs of reduction of a disk drive such as a DVD in size and thickness are also increasing. Generally, in a disk drive which records and reproduces a disk-like storage medium such as a DVD, means for loading and unloading a disk on and from a turntable to exchange disks is needed. To provide more comfortable operability, a disk drive having automatic loading means of disk is required.

Conventionally, as the automatic loading means of a disk, after a disk is transferred by a transfer mechanism, the disk is sandwiched from above and below by a turntable on a lower surface of the disk and a disk-holding clamp member called clamper located above the disk, thereby holding the disk.

According to the conventional disk drive having the above structure, however, when a disk is to be loaded automatically, since there exists the thick clamp member (clamper) provided above the disk, there is a problem that it is difficult to reduce the disk drive in thickness.

In patent document 1 for example, there is described a small and thin disk drive which does not required the clamp member (clamper) above a disk and which includes an automatic loading mechanism for a disk.

FIG. 12 shows this disk drive. The disk drive includes a moving mechanism 101 which vertically moves a rotatable turntable 100. The turntable 100 is moved upward (in the direction A), a disk D on the turntable 100 is abutted against a disk-retaining abutment member 103 at the time of the movement, the disk D is relatively moved toward the turntable 100, and the disk D is allowed to be held on the turntable 100 by a holding mechanism 106 using a pawl 105 provided on a rotation shaft 104 without manual operation.

(Patent Document 1)

Japanese Patent Application Laid-open No. 2002-352794

A disk D such as a DVD is formed at its surface with a burr or a recess of bonded portion in some cases due to deficiency caused during producing process. If a disk D formed at its surface with the burr or recess of bonded portion is loaded on the conventional automatic loading mechanism for a disk, movement of the innermost side of the disk is partially hindered (portion X), and there is a problem that the holding mechanism such as a pawl 105 does not reliably holds the disk D in some cases.

It is an object of the present invention to provide a thin disk drive capable of reliably loading a disk automatically even if the disk is formed at its inner radius side with a burr or a recess of a bonded portion.

DISCLOSURE OF THE INVENTION

A first aspect of the present invention provides a disk drive comprising a turntable which has a ring-like disk receiving surface on which a disk having a center hole is to be placed and which can rotate around a rotation shaft, a disk holding mechanism which holds the disk on the turntable, a disk-retaining abutment member which includes a hole that does not abut against the disk holding mechanism and which has projections provided at an outer periphery of the hole and projecting toward the turntable, and a moving mechanism which allows the disk-retaining abutment member and the turntable to relatively approach each other and separate from each other, wherein the projections are formed by a first deformed portion formed at a position opposed to the disk receiving surface and a second deformed portion formed at a location closer to an inner peripheral side than the disk receiving surface, the projection formed by the second deformed portion most projects toward the turntable.

With this aspect, the projections are formed by the two deformations at opposed locations closer to the outer periphery than the disk holding mechanism and closer to the rotation shaft than the disk receiving surface of the turntable. Therefore, unlike the conventional technique, even if there is a burr or a recess of bonded portion at its inner peripheral side, it is possible to reliably move the disk toward the turntable and hold the disk.

According to a second aspect of the invention, in the disk drive of the first aspect, a first projection is formed by the first deformed portion, a second projection is formed by the second deformed portion, the second projection projects closer to the turntable than the first projection.

With this aspect, the disk is held by the first projection and the disk receiving surface, and the second projection prevents an inner peripheral surface of the disk from floating. Therefore, it is possible to reliably load the disk on the disk holding mechanism.

According to a third aspect of the invention, in the disk drive of the first aspect, an inner peripheral end of the projection formed by the second deformed portion projects in a direction opposite from the turntable.

With this aspect, the rigidity of the projection can be enhanced, and the disk can be pushed with strong force.

A fourth aspect of the invention provides a disk drive comprising a turntable which has a ring-like disk receiving surface on which a disk having a center hole is to be placed and which can rotate around a rotation shaft, a disk holding mechanism which holds the disk on the turntable, a disk-retaining abutment member which includes a hole that does not abut against the disk holding mechanism and which has projections provided at an outer periphery of the hole and projecting toward the turntable, and a moving mechanism which allows the disk-retaining abutment member and the turntable to relatively approach each other and separate from each other, wherein the projections are formed by a first projection formed at a position opposed to the disk receiving surface and a second projection formed at a location closer to an inner peripheral side than the disk receiving surface, the second projection projects closer to the turntable than the first projection.

With this aspect, the disk is held by the first projection and the disk receiving surface, and the second projection prevents an inner peripheral surface of the disk from floating. Therefore, unlike the conventional technique, even if there is a burr or a recess of bonded portion at its inner peripheral side, it is possible to reliably move the disk toward the turntable and hold the disk.

According to a fifth aspect of the invention, in the disk drive of the first or fourth aspect, a position of the disk-retaining abutment member is fixed, the moving mechanism moves the turntable up and down, thereby moving the turntable with respect to the disk-retaining abutment member.

With this aspect, it is possible to thin the automatic loading disk drive.

According to a sixth aspect of the invention, in the disk drive of the first or fourth aspect, the disk-retaining abutment member is provided at a case of the disk drive or a portion of information equipment which accommodates the disk drive.

With this aspect, the disk-retaining abutment member can be formed as the case of the disk drive or a portion of the information equipment which accommodates the disk drive. Therefore, the number of parts can be reduced.

According to a seventh aspect of the invention, in the disk drive of the first or fourth aspect, the projection is formed into a ring-like shape.

With this aspect, the disk can be held more reliably.

According to an eighth aspect of the invention, in the disk drive of the seventh aspect, a width of the first projection in a radial direction is greater than a width of the second projection in the radial direction.

With this aspect, since the width of the first projection is greater than the width of the second projection, the second projection can be displaced. Since the width of the second projection is smaller than the width of the first projection, the pressing force against the disk by the second projection can be concentrated.

According to a ninth aspect of the invention, in the disk drive of the first or fourth aspect, when the disk-retaining abutment member abuts against the disk, the turntable has a predetermined angle with respect to the disk-retaining abutment member.

With this aspect, the disk holding mechanism can hold the disk with small pressing force.

BEST MODE FOR CARRYING OUT THE INVENTION

Figure 1:
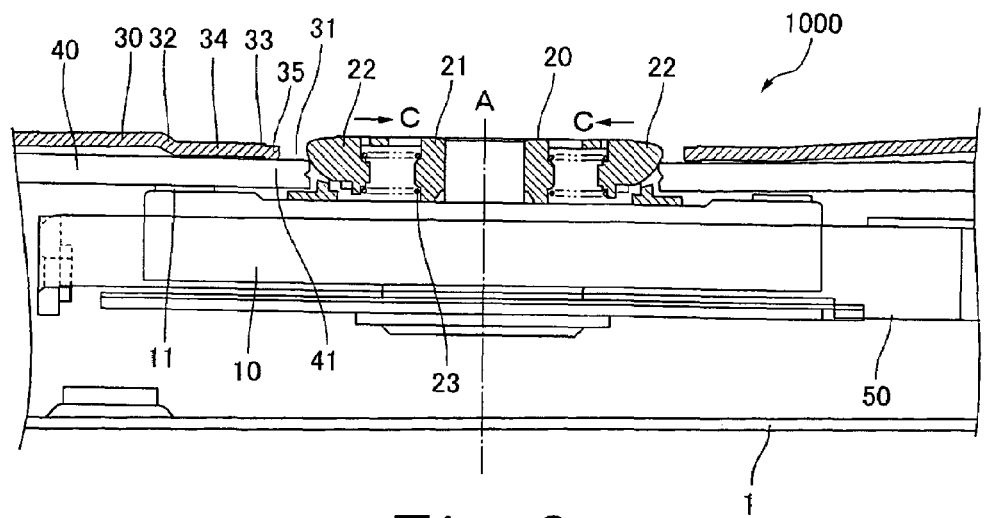
FIG. 1 is a sectional view of an essential portion showing a structure of a disk drive of an embodiment of the present invention.
Figure 2:
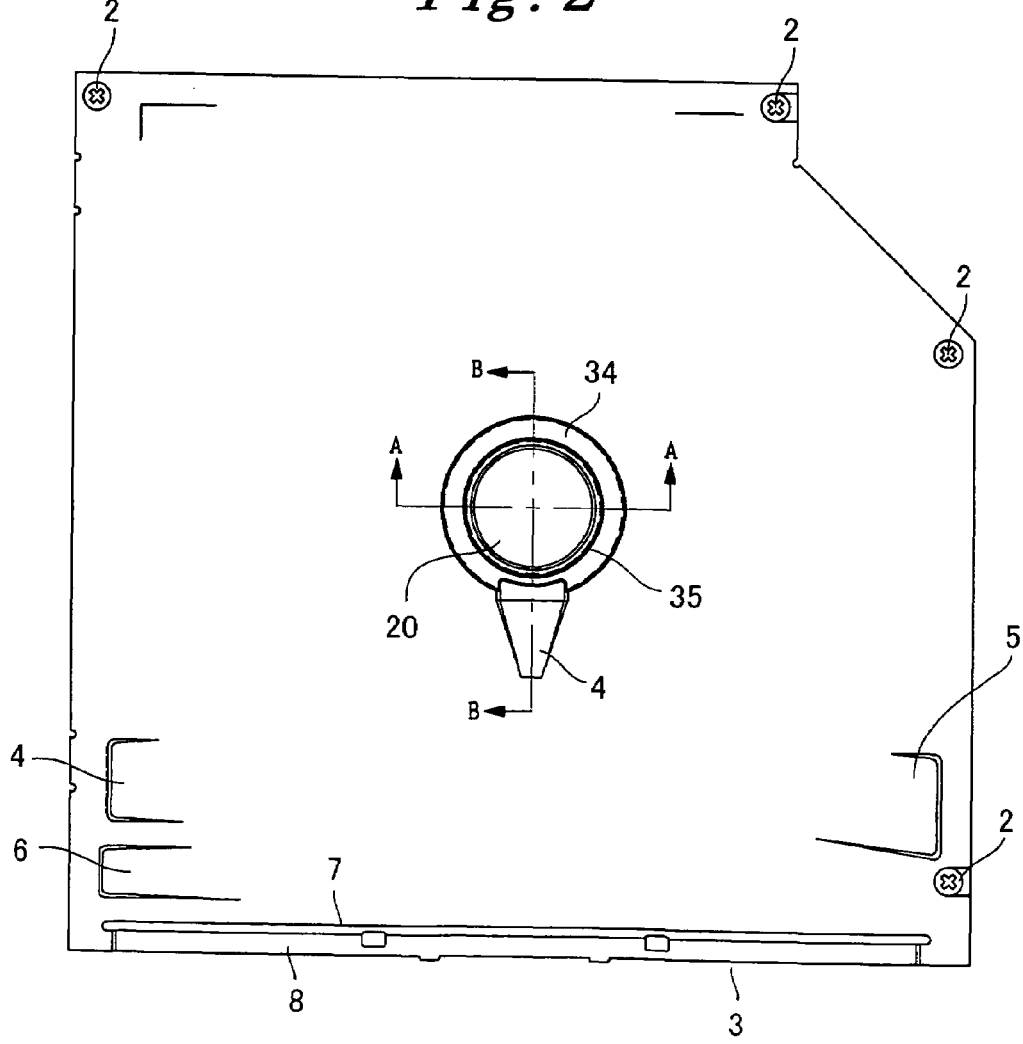
FIG. 2 is a plan view of a lid body on which a disk-retaining abutment member of the disk drive is formed.

FIG. 1 is a sectional view of an essential portion showing a structure of a disk drive 1000 of an embodiment of the present invention, and FIG. 2 is a plan view of a lid body on which a disk-retaining abutment member of the disk drive is formed.

The disk drive 1000 includes a turntable 10 located between a base body 1 and a disk-retaining abutment member 30, and a disk holding mechanism 20 disposed on the turntable 10.

The turntable 10 includes a disk receiving surface 11 on which a disk 40 is to be placed. The turntable 10 can rotate around a rotation shaft A.

The disk holding mechanism 20 includes a hub portion 21, a holding pawl 22 and a resilient member 23. The disk holding mechanism 20 has a first state for holding the disk 40 on the turntable 10 such that the disk 40 can rotate around the rotation shaft A, and a second state (state in which the disk 40 is located above the holding pawl 22 as viewed in FIG. 1) that is different from the first state. The hub portion 21 is fitted into a center hole of the disk 40. The disk 40 is held on the turntable 10 by the holding pawl 22 and the resilient member 23 which biases the holding pawl 22.

In this embodiment, the disk-retaining abutment member 30 is provided on a portion of an upper ceiling plate which forms an outer wall of the disk drive 1000. The disk-retaining abutment member 30 is disposed above the disk 40, and has a hole 31 so that the disk-retaining abutment member 30 does not abut against the disk holding mechanism 20. The disk-retaining abutment member 30 is deformed by molding such as drawing at two portions, i.e., a first deformed portion 32 and a second deformed portion 33 at locations closer to the outer periphery than the disk holding mechanism 20 with respect to disk 40 and closer to the rotation shaft A than the disk receiving surface 11 of the turntable 10. The disk-retaining abutment member 30 includes two projections toward the disk 40. The two projections are a first projection 34, and a second projection 35 formed in the vicinity of the hole 31. These projections 34 and 35 are formed into ring shapes, and abut against a non-recording region 41 which is an inner peripheral region of the disk 40. The first projection 34 and the second projection 35 may be tapered in the outer peripheral direction from the inner peripheral side. It is not always necessary that the ring shape of the projection 35 is continuous.

The disk drive 1000 includes a moving mechanism 50 for moving the turntable 10 relative to the disk-retaining abutment member 30. The moving mechanism 50 may have a structure in which the turntable 10 moves, or a structure in which the disk-retaining abutment member 30 moves. Alternatively, the moving mechanism 50 may have a structure in which both the turntable 10 and the disk-retaining abutment member 30 move. The moving mechanism 50 is vertically moving means for vertically moving the turntable 10. In this embodiment, the moving mechanism 50 rotates around a fulcrum 51 and vertically moves.

Next, a lid body on which the disk-retaining abutment member of the disk drive is formed will be explained using FIG. 2. FIG. 1 is a sectional view taken along the line B-B in FIG. 2.

The disk-retaining abutment member 30 is provided at its outer edge with a plurality of screw holes 2. The disk-retaining abutment member 30 is mounted on the base body 1 by screws.

The disk-retaining abutment member 30 is provided at its central portion with the hole 31. The hole 31 is a circular opening having a greater radius than that of the center hole of the disk 40. Therefore, the hole 31 is greater than the disk holding mechanism 20 which is fitted into the center hole of the disk 40.

The hole 31 is formed at its outer peripheral portion with the ring-like projections 34 and 35 which project toward the base body 1. These ring-like projections 34 and 35 are the second projection 35 provided on the outer periphery of the hole 31, and the first projection 34 provided on the outer periphery of the second projection 35. A projecting height of the second projection 35 is higher than that of the first projection 34. A width of the first projection 34 in the radial direction is greater than that of the second projection 35. The rigidity of the disk-retaining abutment member 30 against the bending can be enhanced by the two projections 34 and 35, and even if the disk-retaining abutment member 30 is deformed at the time of chucking of the disk, since the second projection 35 is higher than the first projection 34, the disk can reliably be held and stable chucking operation can be carried out. The hole 31 is provided with a drawn portion 4 which is tapered from the first projection 34 toward the disk insertion opening 3. This drawn portion 4 forms a convex guide on the side of the base body 1.

The disk-retaining abutment member 30 is formed with a plurality of drawn portions 4, 5 and 6. These drawn portions 4, 5 and 6 form convex guides on the side of the base body 1.

A first drawn groove 7 and a second drawn groove 8 are adjacently formed on an end of the disk-retaining abutment member 30 on the side of its front surface side. The first drawn groove 7 projects toward the base body 1 and has a predetermined length. The second drawn groove 8 projects on the opposite side from the first drawn groove 7 and has a predetermined length. The first drawn groove 7 and the second drawn groove 8 are continuous with each other and have lengths corresponding to the width of the disk. The first drawn groove 7 becomes gradually higher from its center portion toward its end.

These drawn portions 4, 5 and 6 and the drawn grooves 7 and 8 are provided at outer side from the outer peripheral end of the disk 40 and closer to the disk insertion opening 3 than the hole 31 in a state in which the disk 40 is mounted on the disk holding mechanism 20. The disk 40 inserted from the disk insertion opening 3 is guided by the convex guides formed by the drawn portions 4, 5 and 6 and the drawn groove 7. Further, the drawn portions 4, 5 and 6 and the drawn grooves 7 and 8 enhance the strength of the disk-retaining abutment member 30. Although the drawn portion 4 and the drawn portion 5 may be one continuous drawn portion, if the drawn portion is divided into the plurality of portions, the strength of the disk-retaining abutment member 30 can further be enhanced.

In this embodiment, the first drawn groove 7 having the predetermined length and the second drawn groove 8 projecting in the opposite side from the first drawn groove 7 and having the predetermined length are formed on the end of the disk-retaining abutment member 30 on the side of its front surface side having no sidewall. With this structure, the rigidity of the end of the disk-retaining abutment member 30 on the side of its front surface against the bending can be enhanced. By enhancing the rigidity against the bending, especially the chucking operation of the disk 40 can stably be carried out. In this embodiment, the groove height of the end of the first drawn groove 7 is formed higher than that of its center portion. With this, as compared with a case in which a groove having the same height is formed, the rigidity against the bending can be enhanced, and when the disk 40 is to be inserted or discharged out, the disk can be guided in both ends of the first drawn groove 7. Therefore, the disk can move smoothly without damaging a recording surface of the disk 40.

The disk-retaining abutment member 30 is made of aluminum alloy, and urethane bead-mixed fluorine-based coating is applied to the entire inner peripheral surface of the disk-retaining abutment member 30. Only contact surfaces of the projection 35, the drawn portions 4, 5 and 6 and the drawn groove 7 with respect to the disk 40 may be coated. A preferable coating material is urethane resin having beads whose diameter is 20 microns, and in which 5% of fluorine and 1.0 to 1.5% of silicon are mixed in the urethane resin. The friction coefficient of the coating material is preferably 0.2 to 0.6, and more preferably 0.55 or less.

Next, the operation of the embodiment will be explained with reference to FIGS. 3 to 7.

Figure 3:
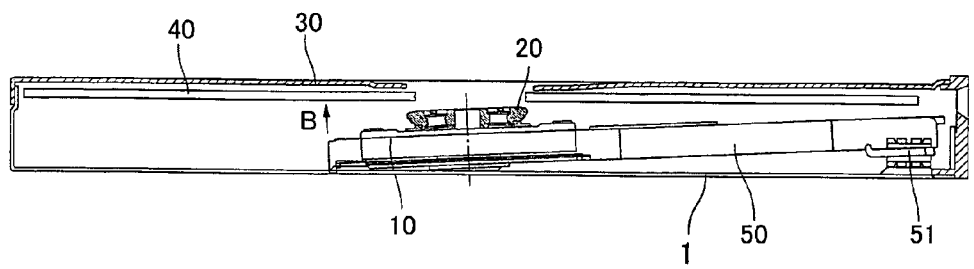
FIG. 3 is a diagram showing a state of the disk drive of the embodiment of the invention before a disk is loaded on a turntable.
Figure 4:
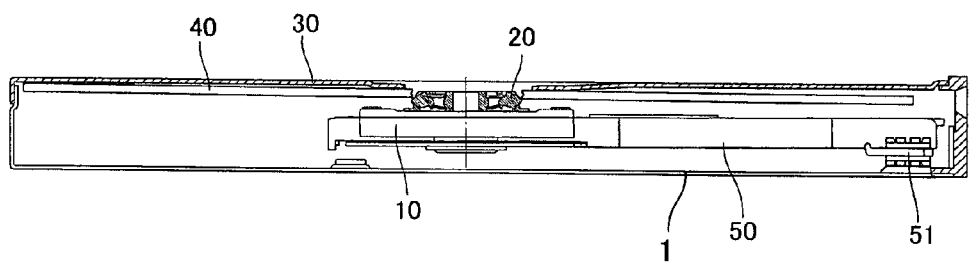
FIG. 4 is a diagram showing a state of the disk drive of the embodiment of the invention when the disk is loaded on the turntable.
Figure 5:
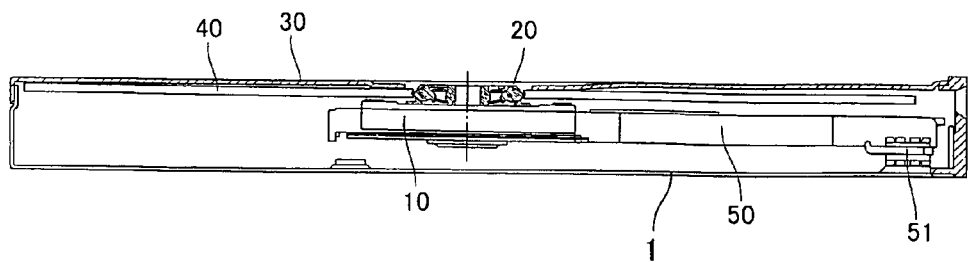
FIG. 5 is a diagram showing a state of the disk drive of the embodiment of the invention when the disk is in abutment against a first projection of the disk-retaining abutment member in a state in which the disk is being loaded on the turntable.
Figure 6:
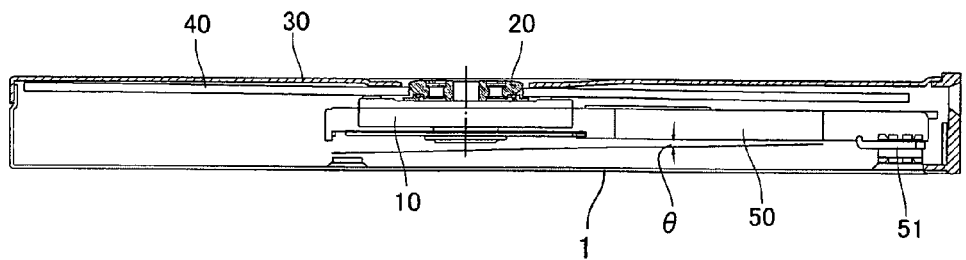
FIG. 6 is a diagram showing a state of the disk drive of the embodiment of the invention when the disk is in abutment against first and second projections of the disk-retaining abutment member after the disk is loaded on the turntable.
Figure 7:
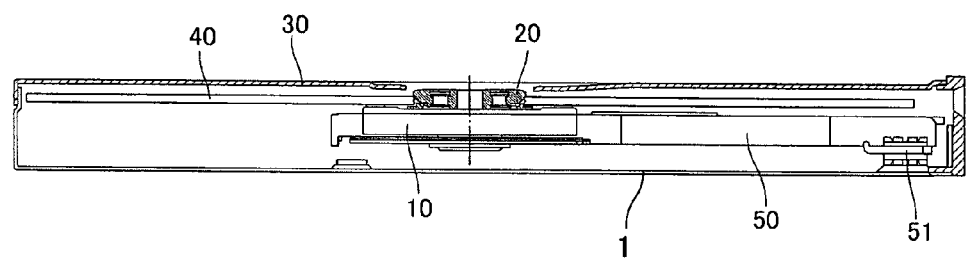
FIG. 7 is a diagram showing a state of the disk drive of the embodiment of the invention when the disk is in a rotatable position after the disk is loaded on the turntable.

FIG. 3 is a diagram showing a state of the disk drive of the embodiment of the invention before the disk is loaded on the turntable. FIG. 4 is a diagram showing a state when the disk is loaded on the turntable. FIG. 5 is a diagram showing a state when the disk is in abutment against the first projection of the disk-retaining abutment member in which the disk is being loaded on the turntable. FIG. 6 is a diagram showing a state when the disk is in abutment against first and second projections of the disk-retaining abutment member after the disk is loaded on the turntable. FIG. 7 is a diagram showing a state when the disk is in a rotatable position after the disk is loaded on the turntable.

As shown in FIG. 3, when the disk holding mechanism 20 is in the second state, the moving mechanism 50 moves the turntable 10 in the direction of the arrow B relative to the disk-retaining abutment member 30 such that the disk-retaining abutment member 30 abuts against the disk 40. Next, from a state in which the first projection 34 of the disk-retaining abutment member 30 is in abutment against the disk 40 as shown in FIGS. 4 to 5, the moving mechanism 50 further moves the turntable 10 relative to the disk-retaining abutment member 30 as shown in FIG. 6. With this, the first projection 34 and the second projection 35 of the disk-retaining abutment member 30 relatively push the disk 40 toward the turntable 10, and the disk holding mechanism 20 is brought into the first state from the second state. Then, as shown in FIG. 6, if the disk holding mechanism 20 is brought into the first state, the moving mechanism 50 slightly moves the turntable 10 downward to a reproducing position.

In this state, the disk-retaining abutment member 30 does not abut against the disk 40, but lower surfaces of the first projection 34 and the second projection 35 of the disk-retaining abutment member 30 are provided with known protection films such as urethane coating so that the disk 40 is not damaged.

FIGS. 6 and 7 show the first state of the disk-retaining abutment member 30 in which the disk 40 is completely held by the disk holding mechanism 20. Other drawings, i.e., FIGS. 3 to 5 show the second state.

As shown in FIG. 1, in this embodiment, if the turntable 10 moves upward, the first projection 34 and the second projection 35 of the disk-retaining abutment member 30 abut against the disk 40 which is positioned above the turntable 10. If the moving mechanism 50 moves the turntable 10 relative to the disk-retaining abutment member 30, the first projection 34 and the second projection 35 of the disk-retaining abutment member 30 relatively push the disk 40 toward the turntable 10. Therefore, even if the disk 40 has a burr or a recess of bonded portion, the state of the disk holding mechanism 20 is reliably switched from the second state to the first state by the first projection 34 and the second projection 35.

That is, if the disk 40 is relatively pushed toward the turntable 10, the holding pawl 22 once retreats in the direction of the arrow C against the biasing force of the resilient member 23 which biases the holding pawl 22 and then, if the disk 40 reaches the receiving surface 11 of the turntable 10, the holding pawl 22 returns to its original state by the biasing force of the resilient member 23, and the holding pawl 22 is brought into the first state where the holding pawl 22 holds the disk 40.

With this, mounting operation of the disk 40 on the turntable 10 is completed.

Although the disk-retaining abutment member 30 is provided on the upper case, i.e., the ceiling plate which forms the outer wall of the disk drive in the embodiment, the present invention is not limited to this structure, and the disk-retaining abutment member 30 may be provided on a portion of information equipment which accommodates the disk drive. Even with this structure, the same function as that of the disk mounting operation can be exhibited.

Although the disk 40 is held and fixed to the turntable 10 by the plurality of holding pawls 22 as the disk holding mechanism 20 in the embodiment, the invention is not limited to this structure, and the disk 40 may be held and fixed by means of a spherical member, a ring-like resilient member or the like.

In the embodiment of the invention, the turntable 10 is maintained in its horizontal position at the reproducing position of the turntable 10. Therefore, in a state in which the disk-retaining abutment member 30 and the disk 40 are in abutment against each other, the turntable 10 is inclined with respect to the disk-retaining abutment member 30 through an angle θ (after the turntable 10 moves up and down along its arc locus), but the turntable 10 may move up and down along a vertical locus. If such a structure in which the turntable 10 moves up and down along the vertical locus, forces required for pulling the holding pawls 22 in the direction of the arrow C are applied to the plurality of holding pawls 22 simultaneously, but if the turntable 10 moves up and down along the arc locus, the forces are dispersed. Therefore, force required for operating the disk holding mechanism 20 can be reduced.

Next, another embodiment will be explained using FIGS. 8 to 11.

Figure 8:
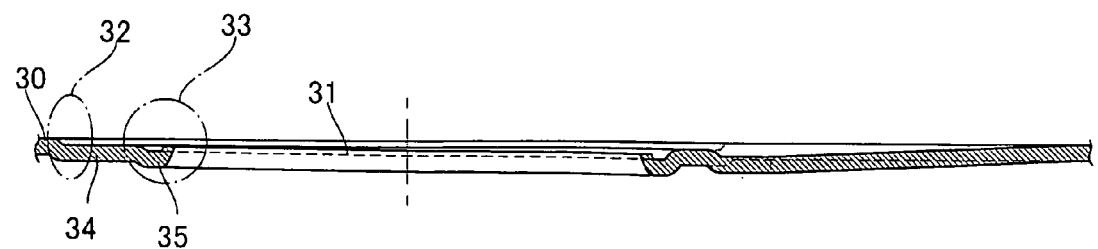
FIG. 8 is a sectional view of an essential portion of a disk-retaining abutment member according to another embodiment of the invention taken along the line B-B in FIG. 2.
Figure 9:
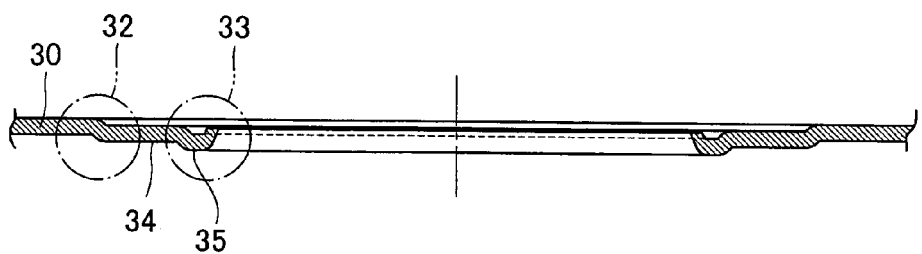
FIG. 9 is a sectional view of an essential portion of a disk-retaining abutment member according to another embodiment of the invention taken along the line A-A in FIG. 2.

FIGS. 8 and 9 are sectional views of an essential portion of a disk-retaining abutment member of the other embodiment. FIG. 8 is the sectional view taken along the line B-B in FIG. 2, and FIG. 9 is the sectional view taken along the line A-A in FIG. 2.

The disk-retaining abutment member 30 includes a first deformed portion 32 formed as an inclined surface at a position opposed to the disk receiving surface, and a second deformed portion 33 formed as a drawn groove at an inner peripheral side from the disk receiving surface. A first projection 34 is formed by the first deformed portion 32, and a second projection 35 is formed by the second deformed portion 33. The second projection 35 projects toward the turntable more than the first projection 34, and the width of the first projection 34 in the radial direction is greater than the width of the second projection 35 in the radial direction. The inner peripheral end of the second projection 35 formed by the second deformed portion 33 projects in the direction opposite from the turntable. With this structure, the rigidity of the second projection 35 can be enhanced, and the disk 40 can be pushed with strong force.

Figure 10:
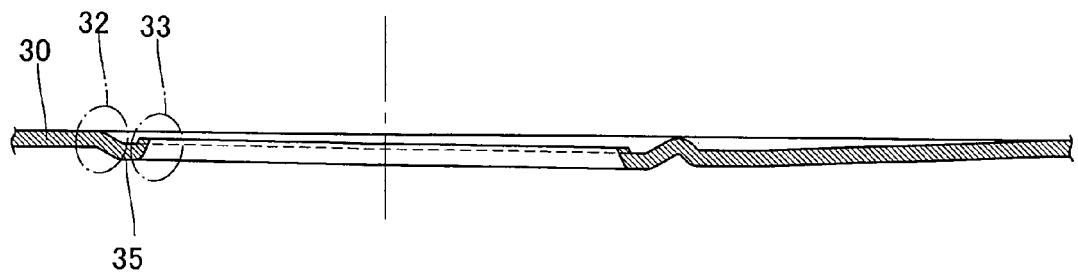
FIG. 10 is a sectional view of an essential portion of a disk-retaining abutment member according to another embodiment of the invention taken along the line B-B in FIG. 2.
Figure 11:
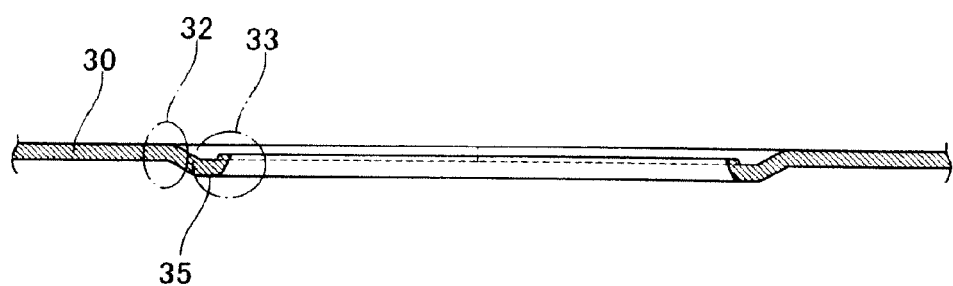
FIG. 11 is a sectional view of an essential portion of a disk-retaining abutment member according to another embodiment of the invention taken along the line A-A in FIG. 2.
Figure 12:
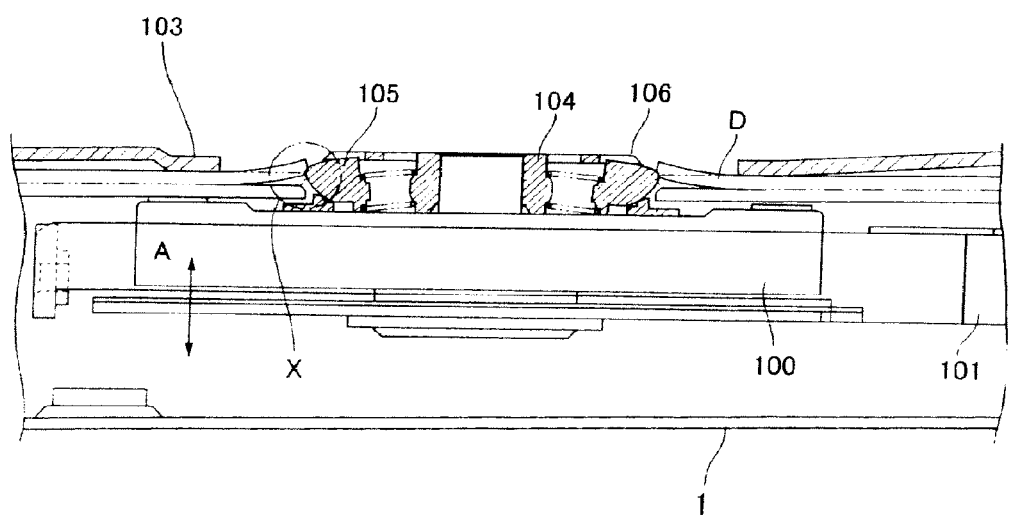
FIG. 12 is a sectional view of a conventional disk drive used for explaining a background technique.

FIGS. 10 and 11 are sectional views of an essential portion of a disk-retaining abutment member of another embodiment. FIG. 10 is the sectional view taken along the line B-B in FIG. 2, and FIG. 11 is the sectional view taken along the line A-A in FIG. 2.

The disk-retaining abutment member 30 includes a first deformed portion 32 formed as an inclined surface at a position opposed to a disk receiving surface, and a second deformed portion 33 formed at inner peripheral side as compared with the disk receiving surface. The second deformed portion 33 has a flat surface portion having an angle different from that of the first deformed portion 32. The second deformed portion 33 also has a turntable. The flat surface portion and the turntable project toward the opposite sides. A second projection 35 is formed by the first deformed portion 32 and the second deformed portion 33. The second projection 35 most projects toward the turntable.

According to the disk drive of the present invention, the disk-retaining abutment member is deformed in two stages at opposed locations closer to the rotation shaft than the disk receiving surface of the turntable at outer peripheral side than the disk holding mechanism, and the disk-retaining abutment member has two projections toward the disk. Therefore, unlike the conventional technique, even if the disk has a burr or a recess of bonded portion at its inner peripheral side, it is possible to move the disk toward the turntable and hold the disk, and the disk can reliably be loaded automatically. Since the disk drive need not have the thickness corresponding to a clamper, it is possible to thin the automatic loading disk drive.

INDUSTRIAL APPLICABILITY

According to the present invention, in a disk drive which records and reproduces a disk storage medium such as a CD and a DVD, even if the disk has a burr or a recess of bonded portion at its inner peripheral side, it is possible to reliably move the disk toward the turntable and to reliably load the disk automatically unlike the conventional technique. Therefore, the present invention can be utilized for a disk drive which is required to be thinned and which is used as domestic video equipment or a peripheral device of a computer.

The invention claimed is:

1. A disk drive comprising a turntable which has a ring-like disk receiving surface on which a disk having a center hole is to be placed and which can rotate around a rotation shaft,
   a disk holding mechanism which holds said disk on said turntable,
   a disk-retaining abutment member which includes a hole that does not abut against said disk holding mechanism and which has projections provided at an outer periphery of said hole and projecting toward said turntable, and a moving mechanism which allows said disk-retaining abutment member and said turntable to relatively approach each other and separate from each other, wherein said projections are formed by a first deformed portion formed at a position opposed to said disk receiving surface and a second deformed portion formed at a location closer to an inner peripheral side than the disk receiving surface, the projection formed by said second deformed portion most projects toward the turntable.

2. The disk drive according to claim 1, wherein
a first projection is formed by said first deformed portion, a second projection is formed by said second deformed portion, said second projection projects closer to said turntable than said first projection.

3. The disk drive according to claim 1, wherein
an inner peripheral end of said projection formed by said second deformed portion projects in a direction opposite from said turntable.

4. The disk drive according to claim 1, wherein
a position of said disk-retaining abutment member is fixed, said moving mechanism moves said turntable tip and down, thereby moving said turntable with respect to said disk-retaining abutment member.

5. The disk drive according to claim 1, wherein
said disk-retaining abutment member is provided at a case of said disk drive or a portion of information equipment which accommodates said disk drive.

6. The disk drive according to claim 1, wherein said projection formed by said second deformed portion is formed into a ring-like shape.

7. The disk drive according to claim 6, wherein a width of said projection formed by said first deformed portion in a radial direction is greater than a width of said projection formed by said second deformed portion in the radial direction.

8. The disk drive according to claim 1, wherein when said disk-retaining abutment member abuts against said disk, said turntable has a predetermined angle with respect to said disk-retaining abutment member.

9. A disk drive comprising a turntable which has a ring-like disk receiving surface on which a disk having a center hole is to be placed and which can rotate around a rotation shaft, a disk holding mechanism which holds said disk on said turntable, a disk-retaining abutment member which includes a hole that does not abut against said disk holding mechanism and which has projections provided at an outer periphery of said hole and projecting toward said turntable, and a moving mechanism which allows said disk-retaining abutment member and said turntable to relatively approach each other and separate from each other, wherein said projections are formed by a first projection formed at a position opposed to said disk receiving surface and a second projection formed at a location closer to an inner peripheral side than the disk receiving surface, said second projection projects closer to said turntable than said first projection.

10. The disk drive according to claim 9, wherein
a position of said disk-retaining abutment member is fixed, said moving mechanism moves said turntable up and down, thereby moving said turntable with respect to said disk-retaining abutment member.

11. The disk drive according to claim 9, wherein
said disk-retaining abutment member is provided at a case of said disk drive or a portion of information equipment which accommodates said disk drive.

12. The disk drive according to claim 9, wherein said second projection is formed into a ring-like shape.

13. The disk drive according to claim 12, wherein
a width of said first projection in a radial direction is greater than a width of said second projection in the radial direction.

14. The disk drive according to claim 9, wherein
when said disk-retaining abutment member abuts against said disk, said turntable has a predetermined angle with respect to said disk-retaining abutment member.

* * * * *